US012602484B2

(12) United States Patent
Jung et al.

(10) Patent No.: US 12,602,484 B2
(45) Date of Patent: Apr. 14, 2026

(54) DOCKER IMAGE VULNERABILITY INSPECTION DEVICE AND METHOD FOR PERFORMING DOCKER FILE ANALYSIS

(71) Applicant: Foundation of Soongsil University-Industry Cooperation, Seoul (KR)

(72) Inventors: Souhwan Jung, Seoul (KR); Thien-Phuc Doan, Seoul (KR); Songi Gwak, Seoul (KR)

(73) Assignee: FOUNDATION OF SOONGSIL UNIVERSITY-INDUSTRY COOPERATION, Seoul (KR)

( * ) Notice: Subject to any disclaimer, the term of this patent is extended or adjusted under 35 U.S.C. 154(b) by 1126 days.

(21) Appl. No.: 17/382,771

(22) Filed: Jul. 22, 2021

(65) Prior Publication Data

US 2022/0108023 A1 Apr. 7, 2022

(30) Foreign Application Priority Data

Oct. 6, 2020 (KR) ........................ 10-2020-0128988

(51) Int. Cl.
*G06F 21/57* (2013.01)
*G06F 9/30* (2018.01)

(52) U.S. Cl.
CPC ........ *G06F 21/577* (2013.01); *G06F 9/30145* (2013.01); *G06F 2221/033* (2013.01)

(58) Field of Classification Search
None
See application file for complete search history.

(56) References Cited

U.S. PATENT DOCUMENTS

| | | | | |
|---|---|---|---|---|
| 8,161,548 B1 * | 4/2012 | Wan | G06F 21/566 | |
| | | | 713/188 | |
| 9,600,668 B2 * | 3/2017 | Wang | G06F 21/563 | |
| 10,346,611 B1 * | 7/2019 | Mao | G06F 21/56 | |
| 10,803,177 B2 * | 10/2020 | Adam | G06F 21/563 | |
| 11,463,478 B2 * | 10/2022 | Nadgowda | G06F 8/71 | |
| 2012/0159629 A1 * | 6/2012 | Lee | G06F 21/566 | |
| | | | 726/24 | |

(Continued)

FOREIGN PATENT DOCUMENTS

| | | |
|---|---|---|
| JP | 2020-154861 A | 9/2020 |
| KR | 10-1445634 B1 | 10/2014 |

(Continued)

OTHER PUBLICATIONS

"What does #(nop) mean in docker history?," StackOverflow, https://stackoverflow.com/questions/41298934/what-does-nop-mean-in-docker-history, 2016.*

(Continued)

*Primary Examiner* — Syed A Zaidi
*Assistant Examiner* — Vadim Savenkov
(74) *Attorney, Agent, or Firm* — Stein IP, LLC

(57) ABSTRACT

Provided is a docker image vulnerability inspection device, which extracts and classifies an instruction by analyzing a manifest file of a docker image, maps a file designated in the instruction to a plurality of classes, sets vulnerability of the file according to an extraction condition preset to each of the plurality of classes, and checks vulnerability of the file according to the vulnerability set to the file based on a CVE database prepared in advance.

4 Claims, 5 Drawing Sheets

(56) References Cited

U.S. PATENT DOCUMENTS

| | | | | |
|---|---|---|---|---|
| 2017/0109536 A1* | 4/2017 | Stopel | .................. | G06F 21/577 |
| 2017/0116415 A1* | 4/2017 | Stopel | ..................... | G06F 21/52 |
| 2017/0177877 A1* | 6/2017 | Suarez | ............... | G06F 21/6218 |
| 2017/0318048 A1* | 11/2017 | Htay | ................... | H04L 63/1433 |
| 2018/0032720 A1* | 2/2018 | Milner | ................. | G06F 21/564 |
| 2018/0114025 A1* | 4/2018 | Cui | ........................... | G06F 8/65 |
| 2018/0239903 A1* | 8/2018 | Bodin | .................. | G06F 21/577 |
| 2018/0307837 A1* | 10/2018 | Ahn | ........................ | G06F 21/14 |
| 2018/0309747 A1* | 10/2018 | Sweet | ................ | G06F 9/45558 |
| 2019/0026474 A1* | 1/2019 | Adam | .................. | G06F 21/563 |
| 2019/0354389 A1* | 11/2019 | Du | ...................... | G06F 9/45545 |
| 2020/0082095 A1* | 3/2020 | Mcallister | ............. | G06F 11/323 |
| 2020/0097662 A1 | 3/2020 | Hufsmith et al. | | |
| 2020/0159933 A1* | 5/2020 | Ciano | ................. | G06F 21/577 |
| 2020/0193016 A1* | 6/2020 | Zeng | .................. | G06F 11/3006 |
| 2020/0218798 A1* | 7/2020 | Kosaka | .................. | G06F 9/451 |
| 2020/0285733 A1* | 9/2020 | Kim | ........................ | G06F 21/53 |
| 2021/0117548 A1* | 4/2021 | Gokhman | .............. | G06F 8/433 |
| 2021/0126949 A1* | 4/2021 | Nadgowda | ......... | H04L 63/1433 |
| 2021/0133330 A1* | 5/2021 | Boulton | ................. | G06F 21/57 |
| 2021/0173935 A1* | 6/2021 | Ramasamy | .......... | G06F 21/577 |
| 2021/0382997 A1* | 12/2021 | Yi | ......................... | G06F 21/577 |
| 2021/0390172 A1* | 12/2021 | Kim | ....................... | G06F 21/53 |
| 2022/0043916 A1* | 2/2022 | Wolfson | ................ | G06F 21/53 |

FOREIGN PATENT DOCUMENTS

| | | | | |
|---|---|---|---|---|
| KR | 10-2019-0076212 A | 7/2019 | | |
| KR | 10-2048141 B1 | 11/2019 | | |
| WO | WO-2017106726 A1 * | 6/2017 | ........ | G06F 21/1063 |
| WO | WO-2020161622 A1 * | 8/2020 | ............ | G06F 21/52 |

OTHER PUBLICATIONS

J. Cito, G. Schermann, J. E. Wittern, p. Leitner, S. Zumberi and H. C. Gall, "An Empirical Analysis of the Docker Container Ecosystem on GitHub," 2017 IEEE/ACM 14th International Conference on Mining Software Repositories (MSR), Buenos Aires, Argentina, 2017, pp. 323-333, doi: 10.1109/MSR.2017.67.*

Jagelid, M. (2020). Container vulnerability scanners: An analysis.*

* cited by examiner

FIG. 5

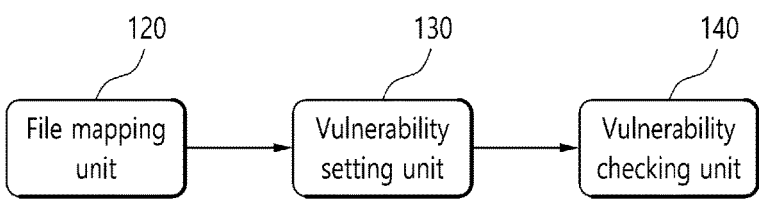

```
   120              130                140
File mapping   →  Vulnerability  →  Vulnerability
    unit           setting unit      checking unit
```

FIG. 6

| aced97fed |
|-----------|
| 91d58e117f |
| 77ddae892 |

Image

→ Reversing →

```
FROM alpine
ADD ......
RUN ......
ENTRYPOINT
```
Dockerfile

→ Mapping →

| aced97fed | ↔ | RUN |
|-----------|---|-----|
| 91d58e117f | ↔ | ADD |
| 77ddae892 | ↔ | FROM |

Potentially
Vulnerable files
Extraction

- Type of Instruction
- File list
- Potentially Vulnerable files
- Source download file URL

CVE-BIN-SCAN

Vulnerable report
- ☐ High     4
- ☐ Medium   8
- ☐ Low      16

CVE
Database

Trivy

DOCKER IMAGE VULNERABILITY INSPECTION DEVICE AND METHOD FOR PERFORMING DOCKER FILE ANALYSIS

CROSS-REFERENCE TO RELATED APPLICATIONS

This application claims priority under 35 U.S.C. § 119 to Korean Patent Application No. 10-2020-0128988, filed on Oct. 6, 2020, in the Korean Intellectual Property Office, the disclosure of which is incorporated herein by reference in its entirety.

TECHNICAL FIELD

This disclosure relates to a docker image vulnerability inspection device and method for performing docker file analysis, and more specifically, to a docker image vulnerability inspection device and method for inspecting vulnerability of a docker image.

BACKGROUND ART

A docker container is a lightweight standalone execution package that includes everything to run applications such as code, runtime, system tools, system libraries and settings. The docker containers perform an operation that bundles software, libraries and configuration files in an environment independent from each other, and may communicate with each other through a separate channel. Since the docker containers are executed through each OS kernel, they use fewer resources than virtual machines.

In this regard, FIG. 1 is a schematic diagram showing a conventional process of creating a docker image from a docker file.

In order to run the docker container 30, a docker image 20 is created, which bundles software, libraries and configuration files. The docker image 20 has a class structure, and all classes may only be read (read-only), so they cannot be modified during execution.

The above docker image 20 is largely created in two ways. First, the docker image 20 may be created through the docker file 10. The docker image 20 is created through the docker file 10, in which all commands for creating the docker image 20 are defined in order, and is automatically created according to an instruction in the docker file 10. At this time, the docker file 10 is written according to a correct format, and the contents of the instruction set must be observed. Second, the docker image 20 is created after the docker container 30 adds or changes a file at runtime or installs a new package. At this time, the docker image 20 adds the changes as a new class. Accordingly, the docker image 20 may be registered in a docker hub 40, which is a separately provided server.

Meanwhile, conventionally, only a few tools are used to inspect vulnerability of the docker image 20. In this regard, some tools such as Clair, Trivy, Anchore and Dagda publish their source codes through Github, and some services such as docker security in the docker enterprise are provided as paid services combined with docker registration service. These vulnerability analysis tools use different technologies, but the overall vulnerability analysis method is similar.

These vulnerability analysis tools collect a vulnerability list from various vulnerability sources such as CVE, CWE and NVD, and store this information as a vulnerable database together with application (or package) name, version, CVE information, and the OS on which the docker image is running.

Such conventional vulnerability analysis tools extract installed packages and dependencies without running the docker container 30. In the process, several techniques are used, and as much information as possible is extracted from the packages and dependencies, along with information such as name and version. Finally, these vulnerability analysis tools compare the extracted information with a database prepared to generate a report, and output the results.

DISCLOSURE

Technical Problem

This disclosure is directed to providing a docker image vulnerability inspection device and method, which extracts an instruction used for creating a docker image from the docker image and inspects vulnerability of the docker image by analyzing the extracted instruction.

Technical Solution

In one general aspect, there is provided a docker image vulnerability inspection device, comprising: an instruction extracting unit configured to extract an instruction by analyzing a manifest file of a docker image and classify the instruction according to a name appearing from the instruction; a file mapping unit configured to map a file designated in the instruction to a plurality of classes based on an instruction classified according to the name of the instruction; a vulnerability setting unit configured to set vulnerability of the file classified into the plurality of classes according to an extraction condition preset to each of the plurality of classes; and a vulnerability checking unit configured to check vulnerability of the file according to the vulnerability set to the file based on a CVE database prepared in advance.

In addition, the instruction extracting unit may be configured to extract a manifest file provided in the docker image and extract at least one instruction from a history field appearing in the manifest file.

In addition, the instruction extracting unit may be configured to classify any instruction extracted by analyzing the manifest file into a no-operation instruction or an operation instruction according to whether there is a no-operation symbol appearing from the name of the instruction.

In addition, when any instruction extracted by analyzing the manifest file is classified into a no-operation instruction, the instruction extracting unit may be configured to classify the instruction into a base instruction showing any file of an operating system in which the docker image is executed or an additional instruction provided to create any file by the docker image, according to a name of the no-operation instruction.

In addition, when any instruction extracted by analyzing the manifest file is classified into an operation instruction, the instruction extracting unit may be configured to classify the instruction classified as the operation instruction into an execution instruction provided to execute any file by the docker image.

In addition, the file mapping unit may be configured to perform: when any instruction is classified according to the name of the instruction into a base instruction showing any file of an operating system in which the docker image is executed, mapping a file designated in the base instruction to a base class, when any instruction is classified according to the name of the instruction into an additional instruction provided to create any file by the docker image, mapping a file designated in the additional instruction to an additional class, and when any instruction is classified according to the name of the instruction into an execution instruction provided to execute file by the docker image, mapping a file designated in the execution instruction to an execution class.

In addition, the vulnerability setting unit may be configured to perform: for the file mapped to the base class, setting vulnerability as safe, for the file mapped to the additional class, setting vulnerability as weak, and for the file mapped to the execution class, when the file mapped to the execution class has a download command or a compile command, setting vulnerability as weak.

In another aspect of the present disclosure, there is also provided a docker image vulnerability inspection method, which uses a docker image vulnerability inspection device for performing docker file analysis, the method comprising: extracting an instruction by analyzing a manifest file of a docker image and classifying the instruction according to a name appearing from the instruction; mapping a file designated in the instruction to a plurality of classes based on an instruction classified according to the name of the instruction; setting vulnerability of the file classified into the plurality of classes according to an extraction condition preset to each of the plurality of classes; and checking vulnerability of the file according to the vulnerability set to the file based on a CVE database prepared in advance.

In addition, the step of classifying an instruction may be to extract a manifest file provided in the docker image and extract at least one instruction from a history field appearing in the manifest file.

In addition, the step of classifying an instruction may be to classify any instruction extracted by analyzing the manifest file into a no-operation instruction or an operation instruction according to whether there is a no-operation symbol appearing from the name of the instruction.

In addition, when any instruction extracted by analyzing the manifest file is classified into a no-operation instruction, the step of classifying an instruction may be to classify the instruction into a base instruction showing any file of an operating system in which the docker image is executed or an additional instruction provided to create any file by the docker image, according to a name of the no-operation instruction.

In addition, when any instruction extracted by analyzing the manifest file is classified into an operation instruction, the step of classifying an instruction may be to classify the instruction classified as the operation instruction into an execution instruction provided to execute any file by the docker image.

In addition, the step of mapping a file to a plurality of classes may include: when any instruction is classified according to the name of the instruction into a base instruction showing any file of an operating system in which the docker image is executed, mapping a file designated in the base instruction to a base class, when any instruction is classified according to the name of the instruction into an additional instruction provided to generate any file by the docker image, mapping a file designated in the additional instruction to an additional class, and when any instruction is classified according to the name of the instruction into an execution instruction provided to execute file by the docker image, mapping a file designated in the execution instruction to an execution class.

In addition, the step of setting vulnerability of the file may include: for the file mapped to the base class, setting vulnerability as safe, for the file mapped to the additional class, setting vulnerability as weak, and for the file mapped to the execution class, when the file mapped to the execution class has a download command or a compile command, setting vulnerability as weak.

Advantageous Effects

According to an aspect of the present disclosure as described above, it is possible to provide a docker image vulnerability inspection device and method, which extracts an instruction used for creating a docker image from the docker image and inspects vulnerability of the docker image by analyzing the extracted instruction.

DESCRIPTION OF DRAWINGS

FIG. 5 is a block diagram showing a process of checking vulnerability of the docker file by a vulnerability checking unit of FIG. 3.

FIG. 6 is a schematic diagram showing an example of the docker image vulnerability inspection device according to an embodiment of the present disclosure.

BEST MODE

Figures 1, 2:
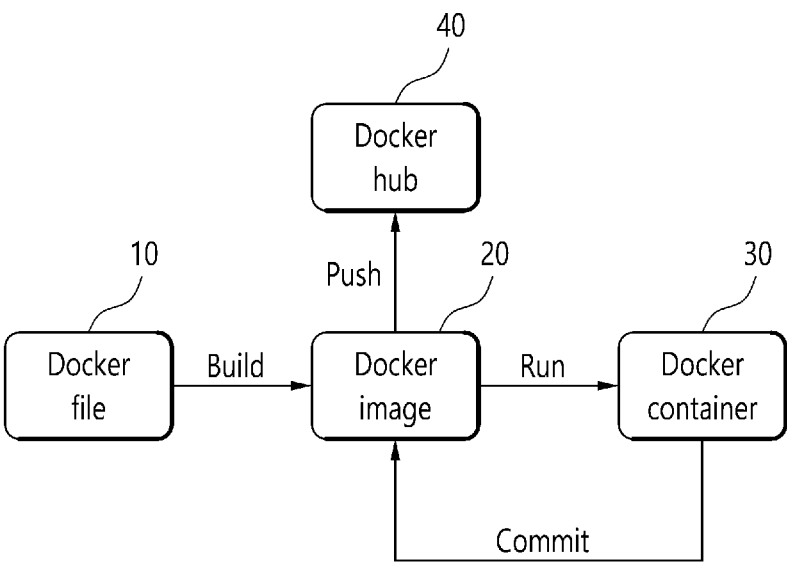
FIG. 1 is a schematic diagram showing a conventional process of creating a docker image from a docker file.
FIG. 2 is a schematic diagram showing a docker image vulnerability inspection system including a docker image vulnerability inspection device according to an embodiment of the present disclosure.

The following detailed description of the present disclosure refer to the accompanying drawings that exemplarily illustrate specific embodiments in which the present disclosure may be implemented. These embodiments are described in sufficient detail to enable a person skilled in the art to practice the present disclosure. It should be understood that various embodiments of the present disclosure are different but need not be exclusive from each other. For example, specific shapes, structures and characteristics described herein may be implemented in other embodiments without departing from the idea and scope of the present disclosure in relation to one embodiment. In addition, it should be understood that locations or arrangement of individual components in each disclosed embodiment may be changed without departing from the idea and scope of the present disclosure. Accordingly, the following description is not intended to limit the scope, and the scope of the present disclosure, if properly described, is limited only by the appended claims, along with all scopes equivalent to the features defined in the claims. Like reference numerals in the drawings indicate the same or similar functions over several aspects.

The term "unit" is defined herein as having its broadest definition to an ordinary skill in the art to refer to a software including instructions executable in a non-transitory computer readable medium that would perform the associated function when executed, a circuit and/or a processor designed to perform the associated function, a hardware designed to perform the associated function, or a combination of a software, a circuit, or a hardware designed to perform the associated function.

Further, it is to be understood that all detailed descriptions mentioning specific embodiments of the present disclosure as well as principles, aspects, and embodiments of the present disclosure are intended to include structural and functional equivalences thereof. Further, it is to be understood that these equivalences include an equivalence that will be developed in the future as well as an equivalence that is currently well-known, that is, all elements invented so as to perform the same function regardless of a structure.

Therefore, it is to be understood that, for example, block diagrams of the present specification illustrate a conceptual aspect of an illustrative circuit for embodying a principle of the present disclosure. Therefore, it is to be understood that all flow charts, state transition diagrams, pseudo-codes, and the like, illustrate various processes that may be tangibly embodied in a computer-readable medium and that are executed by computers or processors regardless of whether or not the computers or the processors are clearly illustrated.

Functions of various elements including processors or functional blocks represented as concepts similar to the processors and illustrated in the accompanying drawings may be provided using hardware having capability to execute software in connection with appropriate software as well as dedicated hardware. When the functions are provided by the processors, they may be provided by a single dedicated processor, a single shared processor, or a plurality of individual processors, and some of them may be shared with each other.

In addition, the explicit use of terms presented as the processor, control, or similar concepts should not be interpreted exclusively by quoting hardware capable of executing software, but should be understood to implicitly include, without limitation, digital signal processor (DSP) hardware, a ROM for storing software, a RAM, and a non-volatile memory. The above-mentioned terms may also include well-known other hardware.

In the claims of the present specification, components represented as means for performing functions mentioned in a detailed description are intended to include all methods for performing functions including all types of software including, for example, a combination of circuit devices performing these functions, firmware/micro codes, or the like, and are coupled to appropriate circuits for executing the software so as to execute these functions. It is to be understood that since functions provided by variously mentioned means are combined with each other and are combined with a method demanded by the claims in the present disclosure defined by the claims, any means capable of providing these functions are equivalent to means recognized from the present specification.

Hereinafter, preferred embodiments of the present disclosure will be described in more detail with reference to the drawings.

FIG. 2 is a schematic diagram showing a docker image vulnerability inspection system including a docker image vulnerability inspection device according to an embodiment of the present disclosure.

A docker image vulnerability inspection system 1 may create a docker file 10 from a docker image 20 by using a docker image vulnerability inspection device 100.

To this end, the docker image vulnerability inspection device 100 may create the docker file 10 by analyzing a manifest file provided in the docker image 20.

Here, the manifest file may contain some metadata of the set in a computing system. For example, the manifest file may be provided to include a name, a version, a license and a connection file for any file used in the computing system.

In this regard, the manifest file provided in the docker image 20 may include an instruction by the docker file 10, a name of the instruction, a file designated in the instruction, and the like.

For example, the manifest file provided in the docker image 20 may include a history field, and the history field may include a plurality of components, and each component may have 'created_by', 'created' and 'empty_layer' attributes.

Here, 'created_by' may refer to an attribute provided to describe an operation performed at any time point, 'created' may refer to an attribute provided to indicate a time point at which any operation is performed, and 'empty_layer' may refer to an attribute provided to determine whether any operation is created in a new class.

In this regard, in a state where the docker image 20 is executed to create a docker container, if any changes are performed by adding or changing any file or installing a new package, a new docker image 20 may be created. At this time, the changes such as adding or changing of any file or installation of a new package may be added as a new class to create a new docker image 20.

At this time, the docker image 20 may be created by executing the docker file 10 by a docker daemon, and accordingly, the docker daemon may generate the docker image 20 by executing instructions appearing from the docker file 10 in a preset order.

The docker image vulnerability inspection device 100 may determine vulnerability of the docker file 10 based on a CVE database representing a standardized list by recording security vulnerabilities and other information security exposures, according to common vulnerabilities and exposures (CVE).

Here, the docker image 20 may be created by executing the docker file 10 in which commands or the like for creating any docker image 20 are defined, and at this time, the docker image 20 may be created by an instruction that is set to appear the order of execution in the docker file 10.

At this time, the docker image 20 may be provided to be executed in any operating system, and in this case, the docker image 20 may be prepared to use any file provided in the operating system in which the docker image 20 is executed.

Meanwhile, the instruction may be classified into a no-operation instruction or an operation instruction according to a no-operation symbol provided to indicate that no operation is performed. In this case, the no-operation instruction may refer to an instruction in which a no-operation symbol exists in the name of the instruction, and the operation instruction may refer to an instruction in which a no-operation symbol does not exist in the name of the instruction.

Here, the no-operation instruction may be classified into a base instruction indicating any file provided in the operating system in which the docker image 20 is executed, and an additional instruction provided to create any file by the docker image 20.

In addition, the operation instruction may be classified into an execution instruction provided to execute any file by the docker image 20.

As such, the instruction may be classified according to the name of the instruction. For example, the no-operation symbol provided to distinguish a no-operation instruction and an operation instruction from each other may appear as #(NOP: No Operation). In this case, in the no-operation instruction, the name for classifying a base instruction or an additional instruction may be provided at one side of the no-operation symbol.

For example, the base instruction may include 'From' in the name of the instruction, and the additional instruction may include 'ADD' or 'COPY' in the name of the instruction. Also, the execution instruction may include 'RUN' in the name of the instruction.

The instruction may also be included in the manifest file provided in the docker image 20, and in this case, the instruction may be classified through the 'created_by' attribute appearing in the manifest file.

Accordingly, the docker image vulnerability inspection device 100 may create the docker file 10 by analyzing the manifest file appearing from the docker image 20.

Hereinafter, the process for the docker image vulnerability inspection device 100 to create the docker file 10 from the docker image 20, classify any file appearing in the docker file 10, and inspect vulnerability of the classified docker file 10 will be described in detail.

Figures 3, 4:
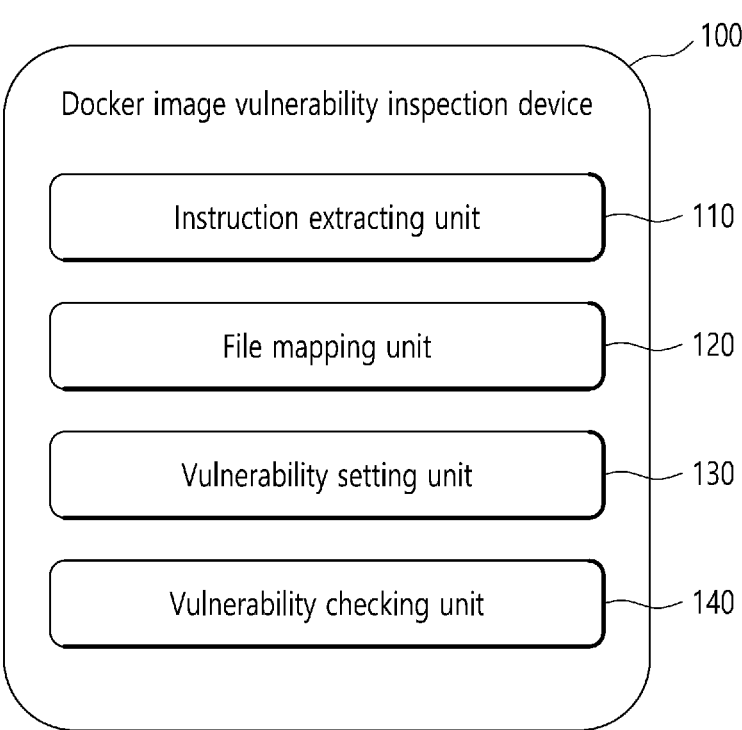
FIG. 3 is a control block diagram showing the docker image vulnerability inspection device according to an embodiment of the present disclosure.
FIG. 4 is a block diagram showing a process of mapping the docker file to a plurality of classes by a docker file mapping unit of FIG. 3.

FIG. 3 is a control block diagram showing the docker image vulnerability inspection device according to an embodiment of the present disclosure.

The docker image vulnerability inspection device 100 may include an instruction extracting unit 110, a file mapping unit 120, a vulnerability setting unit 130, and a vulnerability checking unit 140.

The instruction extracting unit 110 may extract an instruction by analyzing the manifest file of the docker image 20, and the instruction extracting unit 110 may classify the instruction according to the name appearing from the instruction.

To this end, the instruction extracting unit 110 may extract a manifest file provided in the docker image 20, and the instruction extracting unit 110 may extract at least one instruction from a history field appearing in the manifest file.

Here, the history field may be understood as indicating the order in which instructions appearing from the docker file 10 are executed by a docker daemon. For example, the history field may refer to a history field provided in the manifest file of the docker image 20.

Accordingly, the instruction extracting unit 110 may classify any instruction extracted by analyzing the manifest file into a no-operation instruction or an operation instruction according to whether there is a no-operation symbol appearing from the name of the instruction.

Here, if a no-operation symbol exists in the name of any instruction, the instruction extracting unit 110 may classify the instruction into a no-operation instruction, and if a no-operation symbol does not exist in the name of any instruction, the instruction extracting unit 110 may classify the instruction as an operation instruction.

At this time, if any instruction extracted by analyzing the manifest file is classified into a no-operation instruction, the instruction extracting unit 110 may classify the instruction into base instruction showing any file of an operating system in which the docker image 20 is executed or an additional instruction provided to create any file by the docker image 20, according to the name of the no-operation instruction.

For example, if any instruction extracted by analyzing the manifest file is classified into a no-operation instruction and the name of the no-operation instruction includes 'FROM', the instruction extracting unit 110 may classify the corresponding instruction into a base instruction, and if any instruction extracted by analyzing the manifest file is classified into a no-operation instruction and the name of the no-operation instruction includes 'ADD' or 'COPY', the instruction extracting unit 110 may classify the corresponding instruction as an additional instruction.

Meanwhile, if any instruction extracted by analyzing the manifest file is classified into an operation instruction, the instruction extracting unit 110 may classify the instruction classified as an operation instruction into an execution instruction provided to execute any file by the docker image 20.

The file mapping unit 120 may map a file designated in the instruction to a plurality of classes based on the instruction classified according to the name of the instruction.

Here, the file designated in the instruction may refer to a file designated to be added, changed, downloaded, compiled or executed by the instruction, and the file designated in the instruction may include a file provided in the operating system in which the docker image 20 is executed, a file provided in the docker image 20, a file stored in an external server connected to the docker image vulnerability inspection system 1 through a wireless or wired network, and the like.

Accordingly, if any instruction is classified into a base instruction according to the name of the instruction, the file mapping unit 120 may map a file designated in the base instruction to a base class.

In addition, if any instruction is classified to an additional instruction according to the name of the instruction, the file mapping unit 120 may map a file designated in the additional instruction into an additional class.

In addition, if any instruction is classified into an execution instruction according to the name of the instruction, the file mapping unit 120 may map a file designated in the execution instruction into an execution class.

In this regard, the file mapping unit 120 may perform mapping by creating a list of files classified into each class based on the file designated in any instruction.

In this case, the file mapping unit 120 may perform mapping to include a file list mapped to each class and an original file address.

Here, the file list may be provided to list the names of files mapped to each class, and the original file address may be prepared to show an actual location of the file appearing from the file list.

The vulnerability setting unit 130 may set the vulnerability of files classified into a plurality of classes according to an extraction condition preset for each of the plurality of classes.

Here, setting the vulnerability of files classified into a plurality of classes may be understood as classifying individual files mapped to each class into files having possibility of vulnerability.

At this time, for the file mapped to the base class, the vulnerability setting unit 130 may set the vulnerability as safe. Here, the file mapped to the base class may refer to a file prepared in the operating system in which the docker file 10 is executed so that the docker image 20 is created, so the vulnerability of the file mapped to the base class may be understood as safe.

Also, for the file mapped to the additional class, the vulnerability setting unit 130 may set the vulnerability as weak. Here, setting the vulnerability as weak may be understood as each file has possibility that the vulnerability is weak.

In addition, for the file mapped to the execution class, if a download command or a compile command is provided to the file mapped to an execution class, the vulnerability setting unit 130 may set the vulnerability as weak.

Here, the download command may refer to a command provided to download any file based on a network. For example, the download command may include a command such as 'wget', 'curl', 'scp', 'ftp' and 'nc'.

In addition, the compile command may refer to a command provided to perform a certain operation. For example, the compile command may include a command such as 'make', 'build' and 'setup'.

The vulnerability checking unit 140 may check vulnerability of the file according to the vulnerability set for the file, based on a CVE database prepared in advance.

At this time, the vulnerability checking unit 140 may search the file whose vulnerability is set as weak by the vulnerability setting unit 130 in the CVE database, and if the file whose vulnerability is set as weak exists in the CVE database, the vulnerability checking unit 140 may extract information stored in the CVE database for the corresponding file.

Also, if the file whose vulnerability is set as weak does not exist in the CVE database, the vulnerability checking unit 140 may change the vulnerability of the file to safe or pending.

Here, changing the vulnerability of the file that does not exist in the CVE database to pending may be understood as determining that the vulnerability for the corresponding file is verified. Accordingly, by changing the vulnerability of the file that does not exist in the CVE database to pending, the vulnerability checking unit 140 may indicate the need for research on the corresponding file so that the corresponding file may be registered in the CVE database.

Meanwhile, the vulnerability checking unit 140 may extract name and version of any application or service according to the file whose vulnerability is set as weak by using CVE-BIN-TOOL.

FIG. 4 is a block diagram showing a process of mapping the docker file with a plurality of classes by a docker file mapping unit of FIG. 3.

The instruction extracting unit 110 may extract the instruction by analyzing the manifest file of the docker image 20, and the instruction extracting unit 110 may classify the instruction according to the name appearing from the instruction.

To this end, the instruction extracting unit 110 may extract a manifest file provided in the docker image 20, and the instruction extracting unit 110 may extract at least one instruction from a history field appearing in the manifest file.

Accordingly, the instruction extracting unit 110 may classify any instruction extracted by analyzing the manifest file into a no-operation instruction or an operation instruction according to whether there is a no-operation symbol appearing from the name of the instruction.

At this time, if any instruction extracted by analyzing the manifest file is classified into a no-operation instruction, the instruction extracting unit 110 may classify the instruction into a base instruction 111 showing any file of an operating system in which the docker image 20 is executed or an additional instruction 112 provided to create any file by the docker image 20, according to the name of the no-operation instruction.

In addition, if any instruction extracted by analyzing the manifest file is classified into an operation instruction, the instruction extracting unit 110 may classify the instruction classified as an operation instruction into an execution instruction 113 provided to execute any file by the docker image 20.

The file mapping unit 120 may map a file designated in the instruction to a plurality of classes based on the instruction classified according to the name of the instruction.

Accordingly, if any instruction is classified into the base instruction 111 according to the name of the instruction, the file mapping unit 120 may map a file designated in the base instruction 111 to a base class 121.

In addition, if any instruction is classified to the additional instruction 112 according to the name of the instruction, the file mapping unit 120 may map a file designated in the additional instruction 112 into an additional class 122.

In addition, if any instruction is classified into the execution instruction 113 according to the name of the instruction, the file mapping unit 120 may map a file designated in the execution instruction 113 into an execution class 123.

FIG. 5 is a block diagram showing a process of checking vulnerability of the docker file by a vulnerability checking unit of FIG. 3.

The vulnerability setting unit 130 may set the vulnerability of files classified into a plurality of classes according to an extraction condition preset for each of the plurality of classes.

At this time, for the file mapped to the base class, the vulnerability setting unit 130 may set the vulnerability as safe.

Also, for the file mapped to the additional class, the vulnerability setting unit 130 may set the vulnerability as weak.

In addition, for the file mapped to the execution class, if a download command or a compile command is provided to the file mapped to the execution class, the vulnerability setting unit 130 may set the vulnerability as weak.

The vulnerability checking unit 140 may check vulnerability of the file according to the vulnerability set for the file, based on a CVE database prepared in advance.

At this time, the vulnerability checking unit 140 may search the file whose vulnerability is set as weak by the vulnerability setting unit 130 in the CVE database, and if the file whose vulnerability is set as weak exists in the CVE database, the vulnerability checking unit 140 may extract information stored in the CVE database for the corresponding file.

FIG. 6 is a schematic diagram showing an example of the docker image vulnerability inspection device according to an embodiment of the present disclosure.

Referring to FIG. 6, the docker file 10 may be created through reversing of the docker image 20, and the docker file 10 may be mapped so that the vulnerability for the mapped file is set. Accordingly, the file whose vulnerability appears as weak may be extracted (Potentially Vulnerable Extraction). After that, the name and version of an application or service related to the extracted file may be extracted using the CVE-BIN-TOOL, and it may be compared with the CVE database to check the vulnerability.

Meanwhile, Trivy of FIG. 6 may refer to a vulnerability determining process such as a Trivy scanner.

Figure 7:
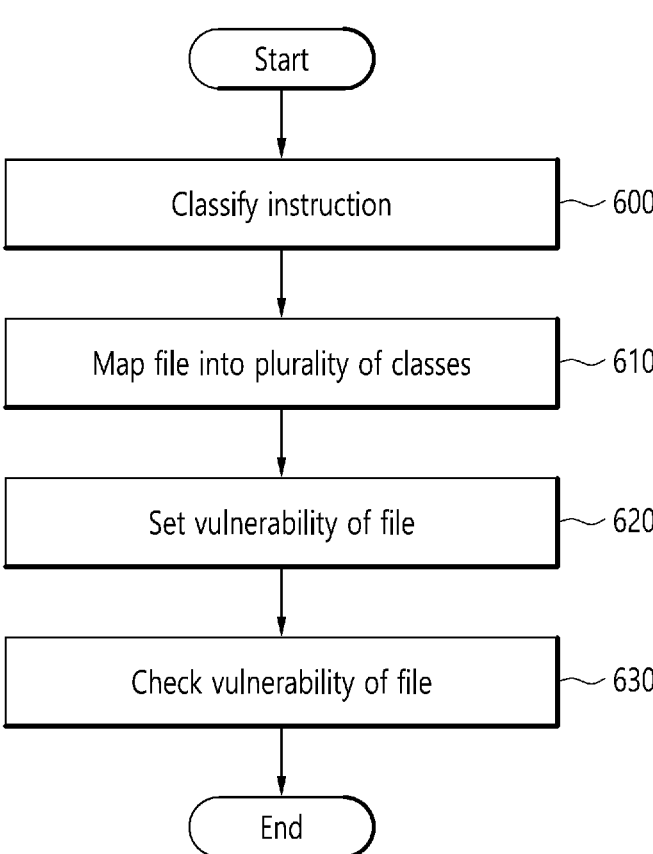
FIG. 7 is a flowchart showing a docker image vulnerability inspection method according to an embodiment of the present disclosure.

FIG. 7 is a flowchart showing a docker image vulnerability inspection method according to an embodiment of the present disclosure.

Since the docker image vulnerability inspection method according to an embodiment of the present disclosure is performed using substantially the same configuration as the docker image vulnerability inspection device 100 shown in FIG. 2, the same components as the docker image vulnerability inspection device 100 of FIG. 2 are endowed with the same reference numerals and will not be described again.

The docker image vulnerability inspection method may include a step of classifying an instruction (600), a step of mapping a file to a plurality of classes (610), a step of setting the vulnerability of the file (620), and a step of checking the vulnerability of the file (630).

The step (600) of classifying an instruction may be a step in which the instruction extracting unit 110 extracts an instruction by analyzing a manifest file of the docker image 20 and classifies the instruction according to a name appearing from the instruction.

The step (610) of mapping a file to a plurality of classes may be a step in which the file mapping unit 120 maps a file designated in the instruction to a plurality of classes based on the instruction classified according to the name of the instruction.

The step (620) of setting vulnerability of the file may be a step in which the vulnerability setting unit 130 may set the vulnerability of the file classified to a plurality of classes according to an extraction condition preset for each of the plurality of classes.

The step (630) of checking the vulnerability of the file may be a step in which the vulnerability checking unit 140 checks the vulnerability of the file according to the vulnerability set for the file, based on the CVE database prepared in advance.

Figure 8:
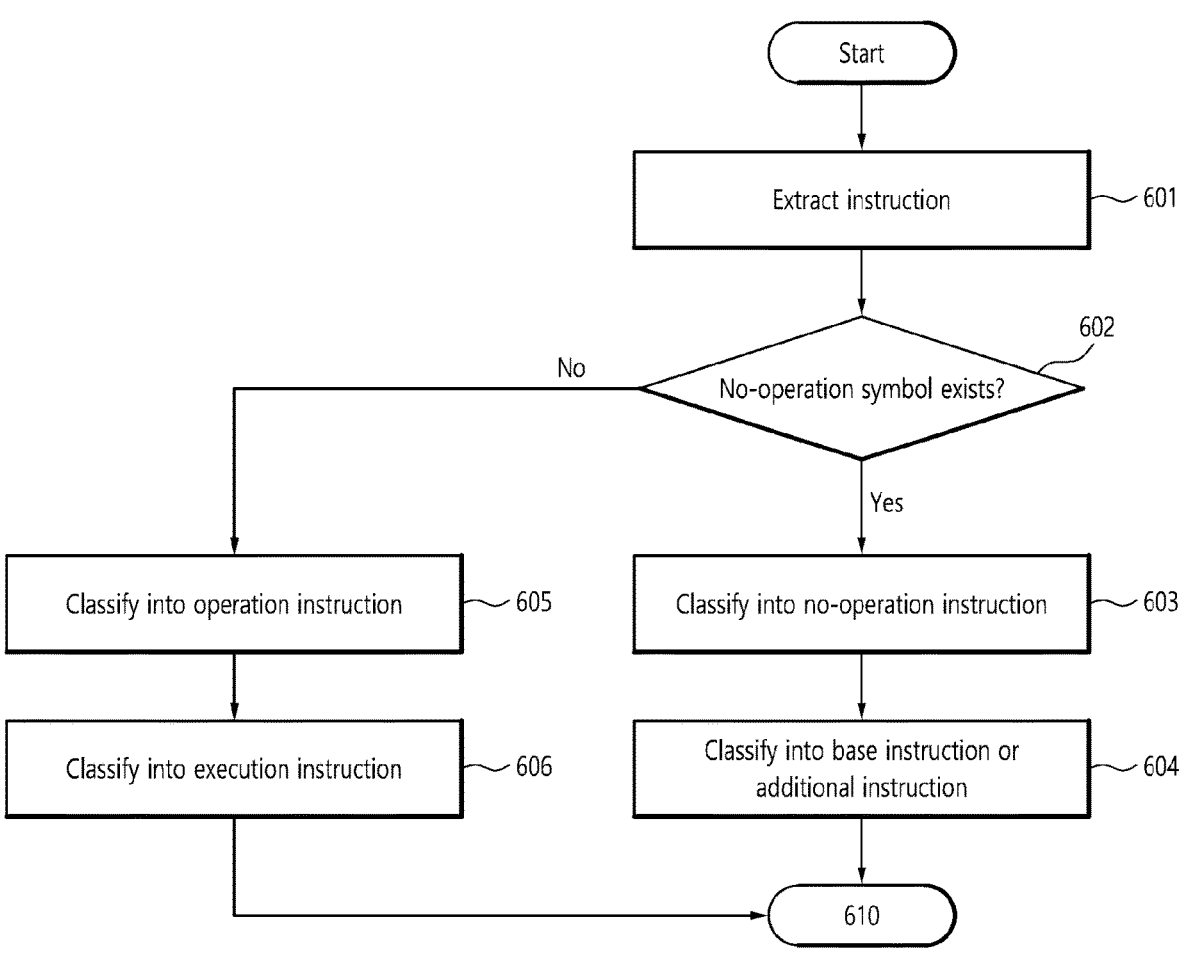
FIG. 8 is a detailed flowchart showing a step of classifying instructions of FIG. 7.

FIG. 8 is a detailed flowchart showing a step of classifying instructions of FIG. 7.

The step (600) of classifying an instruction may include a step of extracting an instruction (601), a step of determining whether there is a no-operation symbol (602), a step of classifying the instruction into a no-operation instruction (603), a step of classifying the instruction into a base instruction or an additional instruction (604), a step of classifying the instruction into an operation instruction (605), and a step of classifying the instruction into an execution instruction (606).

The step (601) of extracting an instruction may be a step in which the instruction extracting unit 110 extracts a manifest file provided in the docker image 20 and extracts at least one instruction from a history field appearing from the manifest file.

The step (602) of determining whether there is a no-operation symbol may be a step in which the instruction extracting unit 110 determines whether there is a no-operation symbol appearing from the name of any instruction extracted by analyzing the manifest file.

The step (603) of classifying the instruction into a no-operation instruction may be a step in which if a no-operation symbol exists in the name of any instruction extracted by analyzing manifest file, the instruction extracting unit 110 classifies the instruction into a no-operation instruction.

The step (604) of classifying the instruction into a base instruction or an additional instruction may be a step in which, if any instruction extracted by analyzing the manifest file is classified into a no-operation instruction, the instruction extracting unit 110 classifies the instruction into a base instruction indicating any file of an operating system in which the docker image 20 is executed or an additional instruction provided to generate an any file by the docker image 20, according to the name of the no-operation instruction.

The step (605) of classifying the instruction into an operation instruction may be a step in which if a no-operation symbol does not exist in the name of any instruction extracted by analyzing the manifest file, the instruction extracting unit 110 classifies the instruction into an operation instruction does.

The step (606) of classifying the instruction into an execution instruction may be a step in which if any instruction extracted by analyzing the manifest file is classified into an operation instruction, the instruction extracting unit 110 classifies the instruction classified as an operation instruction into an execution instruction prepared to execute any file by the docker image 20.

Although the present disclosure has been described with reference to embodiments, it would be understood that various modifications and changes can be made by those skilled in the art from the present disclosure without departing from the idea and scope defined in the appended claims.

REFERENCE SIGNS

1: docker image vulnerability inspection system
10: docker file
20: docker image
30: docker container
40: docker hub
100: docker image vulnerability inspection device

The invention claimed is:

1. A docker image vulnerability inspection device, comprising:
an instruction extracting unit configured to extract an instruction by analyzing a manifest file of a docker image and classify the instruction according to a name of the instruction;
a file mapping unit configured to map a file designated in the instruction to a plurality of classes based on the instruction classified according to the name of the instruction;
a vulnerability setting unit configured to set vulnerability of the file mapped into the plurality of classes according to an extraction condition preset to each of the plurality of classes; and
a vulnerability checking unit configured to check the set vulnerability of the file based on a CVE database prepared in advance,
wherein the instruction extracting unit is further configured to classify the instruction extracted by analyzing the manifest file into a no-operation instruction or an operation instruction according to whether there is a no-operation symbol appearing from the name of the instruction,
wherein when the instruction extracted by analyzing the manifest file is classified into the no-operation instruction, the instruction extracting unit is further configured to classify the instruction into a base instruction showing any file of an operating system in which the docker image is executed or an additional instruction provided to create any file by the docker image, according to a name of the no-operation instruction,
wherein the file mapping unit is further configured to perform:
when the instruction is classified according to the name of the instruction into a base instruction showing any file of an operating system in which the docker image is executed, mapping the file designated in the base instruction to a base class;

when the instruction is classified according to the name of the instruction into an additional instruction provided to create any file by the docker image, mapping the file designated in the additional instruction to an additional class; and when the instruction is classified according to the name of the instruction into an execution instruction provided to execute the file by the docker image, mapping the file designated in the execution instruction to an execution class, wherein the vulnerability setting unit is further configured to perform:

for the file mapped to the base class, setting the vulnerability as safe;

for the file mapped to the additional class, setting the vulnerability as weak; and for the file mapped to the execution class, when the file mapped to the execution class has a download command or a compile command, setting the vulnerability as weak, wherein the instruction extracting unit is further configured to extract the manifest file provided in the docker image and extract at least one instruction from a history field appearing in the manifest file.

2. The device of claim 1, wherein when the instruction extracted by analyzing the manifest file is classified into the operation instruction, the instruction extracting unit is further configured to classify the instruction classified as the operation instruction into an execution instruction provided to execute any file by the docker image.

3. A docker image vulnerability inspection method, comprising:

extracting an instruction by analyzing a manifest file of a docker image and classifying the instruction according to a name of the instruction;

mapping a file designated in the instruction to a plurality of classes based on the instruction classified according to the name of the instruction;

setting vulnerability of the file mapped into the plurality of classes according to an extraction condition preset to each of the plurality of classes; and checking the vulnerability of the file based on a CVE database prepared in advance, wherein the classifying the instruction comprises classifying the instruction extracted by analyzing the manifest file into a no-operation instruction or an operation instruction according to whether there is a no-operation symbol appearing from the name of the instruction, wherein when the instruction extracted by analyzing the manifest file is classified into the no-operation instruction, the classifying the instruction further comprises classifying the instruction into a base instruction showing any file of an operating system in which the docker image is executed or an additional instruction provided to create any file by the docker image, according to a name of the no-operation instruction, wherein the mapping the file to the plurality of classes comprises:

when the instruction is classified according to the name of the instruction into a base instruction showing any file of an operating system in which the docker image is executed, mapping the file designated in the base instruction to a base class;

when the instruction is classified according to the name of the instruction into an additional instruction provided to generate any file by the docker image, mapping the file designated in the additional instruction to an additional class; and when the instruction is classified according to the name of the instruction into an execution instruction provided to execute the file by the docker image, mapping the file designated in the execution instruction to an execution class, wherein the setting the vulnerability of the file comprises:

for the file mapped to the base class, setting the vulnerability as safe, for the file mapped to the additional class, setting the vulnerability as weak, and for the file mapped to the execution class, when the file mapped to the execution class has a download command or a compile command, setting the vulnerability as weak, wherein the classifying the instruction comprises extracting the manifest file provided in the docker image and extracting at least one instruction from a history field appearing in the manifest file.

4. The method of claim 3, wherein when the instruction extracted by analyzing the manifest file is classified into the operation instruction, the classifying the instruction further comprises classifying the instruction classified as the operation instruction into an execution instruction provided to execute any file by the docker image.

* * * * *